Patented Mar. 6, 1951

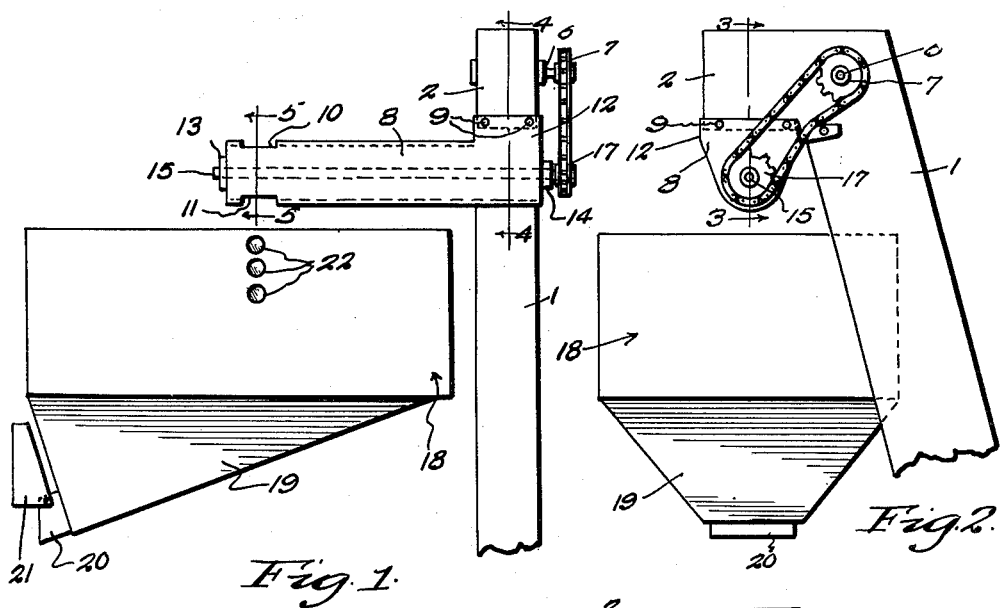
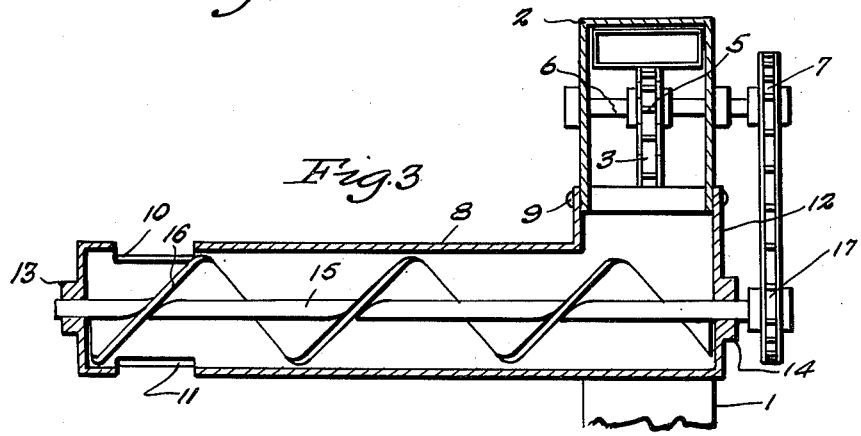
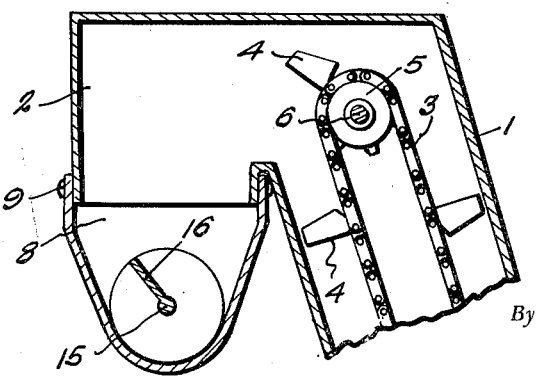
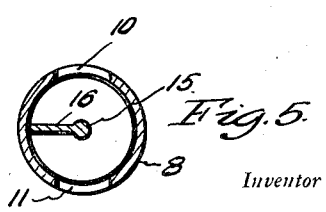

2,544,570

UNITED STATES PATENT OFFICE 2,544,570

GRAIN BIN LOADER

Halbert C. Sturgeon, Hugoton, Kans., assignor to David Fransen and Lillian W. Fransen, both of Wichita, Kans.

Application April 15, 1946, Serial No. 662,236

2 Claims. (Cl. 198—69)

This invention relates to improvements in grain bin loaders for use on a combine harvester thresher.

An object of the invention is to provide an improved grain bin loader adapted for connection with the grain elevator on a combine harvester thresher in overlying relation with the grain bin for discharging grain from the elevator to the grain bin.

Another object of the invention is to provide an improved power driven auger type grain bin loader for attachment to the grain elevator of a combine harvester thresher having a lower grain discharge opening and an upper grain discharge opening which will force the grain into the grain bin to an additional height of from twelve to fifteen inches after the grain has piled up to and above the level of the lower grain discharge opening.

A further object of the invention is to provide an improved grain bin loader for combine harvesters and threshers which will be automatically operable, thereby enabling the driver of the tractor to glance through the peep windows in the side of the grain bin from time to time to note when the bin is full.

The outstanding advantage of the bin loader is the elimination of a man from the combine, ordinarily used to load the bin.

Another object of the invention is to provide an improved mechanically driven screw or auger type grain bin loader for combine harvesters and threshers, which will be highly efficient in operation, and relatively inexpensive to manufacture and produce.

Other objects will appear as the description proceeds.

In the accompanying drawings which form a part of this application,

Figure 1 is a side elevation of a grain elevator and storage bin showing the improved grain bin loader supported on said elevator;

Figure 2 is an end elevation of the grain elevator with attached grain bin loader and adjacent grain storage bin;

Figure 3 is a sectional view taken on the line 3—3 of Figure 2;

Figure 4 is a sectional view taken on the line 4—4 of Figure 1, and

Figure 5 is a sectional view taken on the line 5—5 of Figure 1.

Like characters of reference are used throughout the following specification and the accompanying drawings to designate corresponding parts.

In carrying out the invention, there is provided any desired form of combine harvester thresher having a grain elevator 1 formed with a laterally extending casing 2 at its upper end and an endless grain elevator chain 3 operable therein, upon which the grain cups 4 are secured at spaced intervals. The elevator chain 3 is supported upon the sprocket wheel 5 mounted on the transfer shaft 6 extending through the upper end of the elevator 1, and a sprocket wheel 7 will be mounted on the end of said shaft 6 exteriorly of the elevator 1 for the purpose hereinafter described.

The improved grain bin loader includes an elongated tube-like housing 8 approximately cylindrical in cross section and has a lateral branch 12 at one end which is connected with the lateral extension of the casing 2 by bolts 9 to underlie the same. The opposite end of the housing 8 is provided with the oppositely disposed upper and lower discharge openings 10 and 11 located substantially over the center of a bin 18 with the opening 10 directed upwardly and the opening 11 downwardly as shown in Figs. 1 and 3.

The bearings 13 and 14 will be disposed at the opposite ends of the housing 8 and will support the shaft 15 of the auger or screw 16 operable in said housing 8. A sprocket 17 will be secured to the inner end of the shaft 15 and a sprocket chain will be connected between said sprockets 17 and 7 to drive the grain bin loader auger or screw from the same source of power which drives the elevator chain 3.

The grain storage bin 18 is mounted below the loader housing 8 and includes a substantially rectangular shaped body portion having a sloping U-shaped bottom 19 and provided with a discharge spout 20 and a gate closure 21 therefor. A plurality of glass peep windows or ports 22 will be arranged in vertical alignment through the side wall of the bin 18, so that the tractor driver operating the combine may readily glance through said windows or ports from time to time to see how the bin is being filled.

In operation, the grain will be carried up the elevator and dumped into the inlet collar 12 of the loader housing 8, and the rotating auger or screw 16 will force the grain along through the housing 8 and discharge the grain through the lower discharge opening 11, to drop into the storage bin 18. As the bin fills from the center it builds up in the form of a cone with the dropping grain sliding down the sides thereof until the apex of the cone reaches and closes off the opening 11. When the bin 18 has been filled to a point where the grain reaches the discharge opening 11 and closes off the same, a substantially vacant space will still remain around the walls of the bin but the upper opening 10 will then discharge the grain upwardly to fall outwardly and downwardly over the sides of the grain pile within the bin to fill the outer vacant space until an additional depth of grain has piled up to a height of twelve to fifteen inches. Should the grain overflow the bin, it will merely fall on the ground and cause no injury to machinery of the combine.

From the foregoing description, it will be apparent that there has been devised a highly efficient form of grain bin loader, which will be positive in action, and relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A bin loader for a combine harvester thresher having a grain bin and a grain elevator for lifting grain above the bin including an elongated tubular housing having an inlet at one end adapted for connection with the discharge of the elevator and adapted to extend horizontally above said bin and provided with top and bottom discharge openings, a screw conveyor operable within the tubular housing of the loader for moving grain from the inlet to the bottom opening for discharge into the bin in a substantially cone-shaped pile until the apex of the cone closes said bottom opening and then for discharging grain through said top opening for filling in space between the cone-like pile and walls of said bin.

2. In a combine harvester thresher including a grain storage bin carried by the harvester and a grain elevator for elevating grain from the thresher upwardly above said bin, a bin loader including a horizontally arranged tubular housing having an inlet at one end in connection with the discharge of the elevator and having top and bottom discharge openings located substantially above the center of the bin, a screw conveyor rotatable in the tubular housing for moving grain discharged from the elevator to the bottom discharge opening until the grain pile in the bin closes said discharge opening and then for discharging the grain upwardly through the top discharge opening for outward and downward movement for filling in space remaining in said bin.

HALBERT C. STURGEON.

REFERENCES CITED

The following references are of record in the file of this patent:

UNITED STATES PATENTS

| Number | Name | Date |
| --- | --- | --- |
| 329,710 | Bricker | Nov. 3, 1885 |
| 812,478 | Brewster | Feb. 13, 1906 |
| 1,615,334 | MacGregor | Jan. 25, 1927 |
| 2,290,039 | Ford | July 14, 1942 |
| 2,296,007 | Weisenberger | Sept. 15, 1942 |
| 2,425,681 | Lewis et al. | Aug. 12, 1947 |

FOREIGN PATENTS

| Number | Country | Date |
| --- | --- | --- |
| 814,112 | France | June 17, 1937 |